R. JANCLAES & W. KAULHAUSEN.
DETACHABLE WHEEL RIM.
APPLICATION FILED OCT. 26, 1909.

974,668.

Patented Nov. 1, 1910.

Witnesses:

Inventors:

UNITED STATES PATENT OFFICE.

REINER JANCLAES AND WILLIAM KAULHAUSEN, OF AIX-LA-CHAPELLE, GERMANY.

DETACHABLE WHEEL-RIM.

974,668.   Specification of Letters Patent.   Patented Nov. 1, 1910.

Application filed October 26, 1909. Serial No. 524,738.

*To all whom it may concern:*

Be it known that we, REINER JANCLAES and WILLIAM KAULHAUSEN, citizens of the German Empire, residing at Aix-la-Chapelle, State of Prussia, Germany, have invented a Detachable Wheel-Rim, of which the following is a complete specification, reference being had to the accompanying drawings.

This invention relates to a detachable wheel rim which is secured upon the felly of a wheel by means of radially adjustable bolts set in motion by aid of a rotatable ring.

According to this invention the bolts are guided between the side surface of the wheel felly and a ring fastened thereon, and are pivotally connected by means of rods with another ring which is revolubly mounted upon the wheel hub. Consequently it needs only a turning of the hub ring to the right or to the left in order to withdraw the bolts, whereupon the rim supporting the tires can easily be detached from the felly of the wheel.

Figure 1:
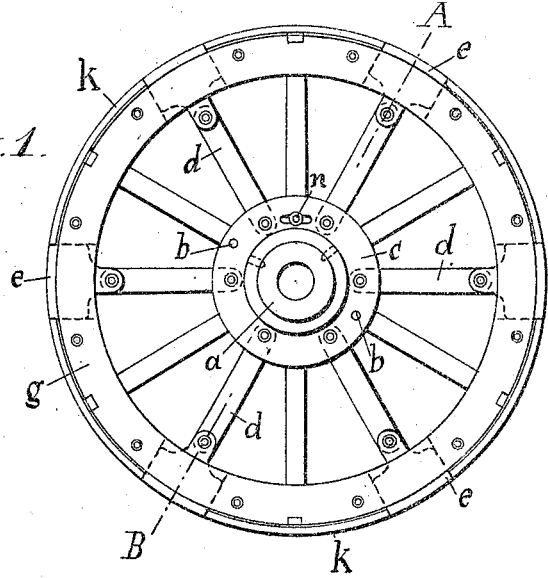
Figure 2:
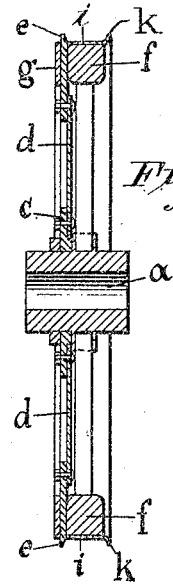
Figure 3:
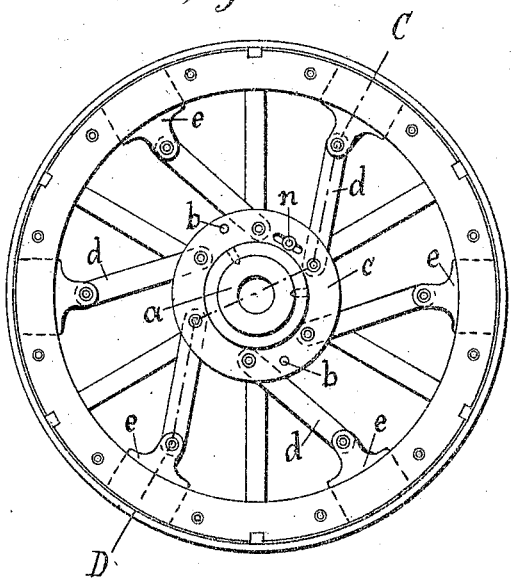
Figure 4:
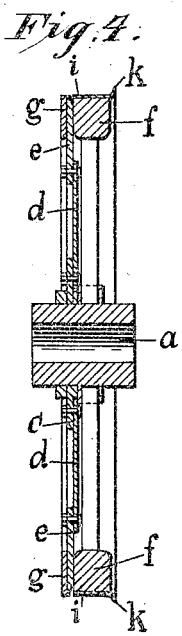

In the accompanying drawing, Figure 1 illustrates a side elevation of the wheel with the protracted bolts. Fig. 2 shows a section of Fig. 1 on the line A—B. Fig. 3 shows a side elevation of the wheel with the bolts retracted. Fig. 4 is a section on the line C—D of Fig. 3.

Upon the wheel hub $a$ is placed the disk ring $c$, which can be turned by means of a key which engages in the holes $b$. The rods $d$ are pivotally connected with the ring $c$, which rods are also pivoted to the bolts $e$. These bolts are held by means of the ring $g$ fastened by means of screws sidewise to the wheel felly $f$ and guided in recesses of the side surface of the said felly. Moreover upon the latter there is secured the fixed metal rim $i$ fastened by means of screws which has the edge $k$ raised at one side; the fixing of the hub ring $c$ is effected by means of a device already known, which comprises a pin $n$ placed under spring pressure and guided in a sleeve. The sleeve is fastened upon the hub ring $c$. The pin $n$ passes through this ring and enters in each of the two terminal positions of the hub ring into corresponding holes in the fixed hub. The fixed wheel rim $i$, the wheel felly $f$ and the side ring $g$ are intermittently recessed in the well known manner in order to allow the nuts, which serve for holding fast the tire up 1 the removable rim, to pass through on the application or removal of the latter.

The securing of the detachable rim upon the wheel by aid of the bolts $e$ is effected as follows: when the rim is pushed over the fixed rim $i$ it rests against the wheel edge $k$. If then the bolts $e$ are pushed out by turning the ring $c$ beneath the rim $g$ (Figs. 1 and 2), then the removable rim is clamped fast between the edge $k$ and the bolts $e$. If, on the other hand, the removable rim is to be removed from the fixed rim $i$, then the bolts $e$ are pushed back by turning the ring $c$ in the opposite direction (Figs. 3 and 4). Then the removable rim together with its tire can be easily taken off over the ring $g$ from the fixed rim $i$.

Having now particularly described our invention, we declare that what we claim is:—

1. A device of the character described, comprising a felly, a ring secured to the side of said felly, bolts held in recesses of the felly by said ring, a fixed rim upon the felly having a raised edge on one of its sides, rods pivotally connected with one of their ends to said bolts, a ring secured to the hub of a wheel pivotally connected to the other ends of said bolts, and having holes to be engaged by an adjusting key, and a spring actuated pin, a sleeve fastened upon the hub ring guiding the pin, said pin entering holes in the hub at each of its terminal positions for holding said hub ring in adjusted position, substantially as described and for the purpose set forth.

2. A device of the character described, comprising a felly, a ring secured to the side of said felly, bolts held in recesses of the felly by said ring, a fixed rim upon the felly having a raised edge on one of its sides, said felly, ring, and fixed rim being intermittently recessed, to allow the passage of the fastening means for the tire upon the rim, rods pivotally connected with one of their ends to said bolts, means pivotally connected to the other ends of said bolts for actuating the rods and bolts, and means for holding said actuating means in adjusted position, substantially as described and for the purpose set forth.

REINER JANCLAES.
WILLIAM KAULHAUSEN.

Witnesses:
H. SCHMITZ,
HENRY QUADFLIEG.